United States Patent
Foerster et al.

(10) Patent No.: US 6,568,665 B2
(45) Date of Patent: May 27, 2003

(54) PNEUMATIC SHOCK-ABSORBER

(75) Inventors: Günther Foerster, Melbeck (DE); Uwe Heiber, Erfurt (DE); Karsten Klatt, Gotha (DE)

(73) Assignee: Intech Thüringen GmbH, Walterhausen (DE)

( * ) Notice: Subject to any disclaimer, the term of this patent is extended or adjusted under 35 U.S.C. 154(b) by 0 days.

(21) Appl. No.: 09/979,250

(22) PCT Filed: May 7, 2001

(86) PCT No.: PCT/DE01/00858
§ 371 (c)(1),
(2), (4) Date: Jan. 24, 2002

(87) PCT Pub. No.: WO01/70526
PCT Pub. Date: Sep. 27, 2001

(65) Prior Publication Data
US 2002/0158381 A1 Oct. 31, 2002

(30) Foreign Application Priority Data
Mar. 20, 2000 (DE) .......................... 100 13 490

(51) Int. Cl.⁷ .............................. B60G 17/015
(52) U.S. Cl. ............................ 267/64.27; 267/122
(58) Field of Search .................. 267/122, 123, 267/64.19, 64.21, 64.23, 64.24, 65.25, 64.27

(56) References Cited
U.S. PATENT DOCUMENTS 4,778,156 A * 10/1988 Imaizumi et al. ........ 267/64.21
4,798,369 A     1/1989 Geno et al.
5,725,066 A * 3/1998 Beard et al. ............. 267/64.24

FOREIGN PATENT DOCUMENTS

| | | |
|---|---|---|
| DE | 34 23 602 | 1/1986 |
| DE | 34 46 411 | 7/1986 |
| DE | 36 20 957 | 1/1987 |
| DE | 40 35 784 | 6/1991 |
| DE | 42 43 530 | 6/1994 |
| DE | 44 13 559 | 10/1995 |
| DE | 196 48 112 | 11/1996 |
| DE | 197 01 713 | 1/1997 |
| DE | 296 20 721 | 4/1997 |
| GB | 1 015 010 | 12/1965 |
| JP | 58081246 | 5/1983 |
| JP | 60168933 | 9/1985 |
| JP | 01044312 | 2/1989 |
| JP | 02031043 | 2/1990 |
| JP | 04266632 | 9/1992 |
| JP | 07215034 | 8/1995 |

* cited by examiner

Primary Examiner—Matthew C. Graham
(74) Attorney, Agent, or Firm—Collard & Roe, P.C.

(57) ABSTRACT

The invention relates to a pneumatic shock-absorber equipped with a height sensor which is to be mounted onto a rail vehicle. The aim of the invention is to prevent components of the rail vehicle, such as supports for the superstructure and/or an additional volume of pressure formed by a cradle, from being drilled or modified in another way in order to create the installation space for the height sensor. The inventive pneumatic shock-absorber is characterized in that an upper extension arm and a lower extension arm extend laterally from the upper support plate and lower mounting plate respectively and that the height sensor is positioned between the two extension arms.

11 Claims, 2 Drawing Sheets

PNEUMATIC SHOCK-ABSORBER

CROSS REFERENCE TO RELATED APPLICATIONS

Applicants claim priority under 35 U.S.C. §119 of German Application No. 100 13 490.4, filed on Mar. 20, 2000. Applicants also claims priority under 35 U.S.C. §120 of PCT/DE01/00858, filed on Mar. 7, 2001. The international application under PCT article 21(2) was not published in English.

DESCRIPTION

The invention relates to a pneumatic shock absorber comprised of at least the following components:

An upper support plate;
a lower part, which may be designed in the form of a piston, laminated spring or the like, and which comprises a lower mounting plate;
a bellows acted upon by pressure and made of elastomeric material and connecting the upper support plate and the lower component with each other, using fastening means (e.g. clamping rings); as well as
a height sensor.

For raising the riding comfort and the safety in modern rail-borne vehicles, systems are increasingly employed for controlling the level of height, for adapting the height of the vehicles, for diagnosing defects and for continuously monitoring the condition of the vehicle. As secondary suspension means, pneumatic shock absorbers are very often used. Their height can be varied by feeding or blowing off compressed air as required according to the given load and/or driving conditions. For this purpose, the pneumatic springs are coupled with systems for determining with the help of such systems either the height of the pneumatic shock absorber directly or the spacing between two parts moving in relation to each other (for example the superstructure of the railroad car and a suitable fixed pivot point on the bogie). In the simplest case, use is made for said purpose of mechanical lever systems that are pivot-mounted, for example on one side of the bogie in a fixed site, and connected on the other side with a lever mechanism that is located on a control valve mounted on the superstructure of the railroad car. When a relative movement occurs between the bogie and the superstructure of the railroad car, a reaction of the control valve is triggered by the setting of said lever in such a manner that compressed air is either supplied or blown off. Such systems have the drawback that they have a response accuracy that can be adjusted in a fixed manner only once. A high response accuracy does in fact permit adequately good and rapid regulation of the level in the standstill condition (for example when the height of the rail vehicle is adjusted for the first time), but leads to undesirable continuous reactions of the control valve when the vehicle is moving. With a lower response accuracy, on the other hand, it is possible to continually supply or blow-off compressed air (for example when short rail shocks occur as it may be the case when driving through rail switches); however, controlling the height at a standstill, in particular when the height of the rail vehicle is adjusted for the first time, is clearly made more difficult.

For this reason, systems are increasingly gaining importance in which height sensors are employed for determining the variations in the level in the presence of relative movements between the bogie and the superstructure of the railroad vehicle. The values measured by such height sensors are processed in a control unit, which then generates corresponding control signals transmitted to the control valves, whereby short-time changes in the measured values can be filtered out. Known are, for example height sensors that are installed in the interior of the pneumatic shock absorber. Changes in the height are detected by such height sensors inductively (DE 34 46 411 A1; DE 40 35 784 A1; DE 44 13 559 A1), or by means of ultrasound (DE 36 20 957 A1; DE 34 23 602 A1; U.S. Pat. No. 4,798,369). Pressure sensors that are mounted on the outer wall of a roll-off piston and actuated by the pneumatic shock absorber bellows rolling off on the roll-off piston, are known as well (DE 42 43 530 A2). However, the applicability of each of said solutions is limited to pneumatic suspension systems whose pneumatic suspension bellows are designed in the form of a so-called tubular rolling bellows, and which are capable of substantially performing only vertical movements in the direction of their longitudinal axis. Such pneumatic suspension systems are primarily employed in motor vehicles.

Substantial deflections in the horizontal direction occur to some extent in connection with rail-borne vehicles, thus perpendicular to the operating direction of the pneumatic shock absorber. Such deflections can be absorbed only by pneumatic shock absorber bellows designed in the form of so-called semi-rolling bellows. A solution for installing a height sensor in such a pneumatic suspension system is described, for example in published patent DE 296 20 721 U1. In said known system, a mechanical height sensor comprised of a lower component (which, as a rule, is a laminated spring) and an upper component (=the upper support plate) is installed in such a manner that a tappet actuated by spring force is pressed against the upper component, whereas the housing of the sensor is installed in the lower component in a fixed manner. The change in the distance of travel of the tappet is converted into an electrical signal and supplied to a control unit. Such a solution is disclosed in Japanese patent specification 4-266 632 as well. However, owing to the mechanical and electronic components of a height sensor designed in such a way, as well as to the stroke of the tappet that has to be realized, the result is necessarily a minimum length of the height sensor conditioned by the construction, which, in particular in conjunction with flat pneumatic suspension systems, leads to the fact that components of the height sensor protrude from the pneumatic suspension system. This may lead to substantial installation problems especially if the pneumatic suspension system is mounted with its lower component on a support of the bogie. Furthermore, installation cases are known in which the pneumatic suspension system is directly connected with an additional pressure reservoir via the lower component. In such a case, the installed height sensor obstructs the exchange of air between the pneumatic suspension system and the additional pressure reservoir. This could be compensated only with a complicated type of construction of the lower component, in which suitable channels would have to be provided for the exchange of air.

Feasible solutions for such complicated installation conditions are introduced, for example in patent specifications DE 196 48 112 C1 and DE 197 01 713 C1. Patent document DE 196 48 112 C1 introduces an ultrasound sensor installed on the side of the vehicle undercarriage. The reflector component of said ultrasound sensor has a lens-shaped, convex surface, with the area normal of said surface being directed at the transmitting/receiving component. Apart from the fact that the reflector component has to be manufactured with a great amount of expenditure, such a solution is not employable in connection with large horizontal deflections of the pneumatic shock absorber as they occur in connection with rail-borne vehicles. The same applies to the solution introduced in patent specification DE 197 01 713 C1 as well, where an ultrasound sensor is installed in the compressed air feed line. In both cases, the horizontal deflection of the pneumatic shock absorber leads to the fact that no continuously stable signal path is assured between the transmitting and receiving units and the ultrasound sensor.

Therefore, the invention is based on the problem of avoiding the described drawbacks of the known technical solutions, and of introducing a solution that can be produced at favorable cost and permits the change in height of a pneumatic shock absorber to be determined in a simple manner, taking into account the horizontal deflections, in cases where the installation of a height sensor in the interior of the pneumatic shock absorber is not possible because of lack of space above and/or below the pneumatic shock absorber for the components of the height sensor projecting from the pneumatic shock absorber, or in cases where the pneumatic shock absorber is directly connected with an additional pressure reservoir and the exchange of air would be interrupted or obstructed by a height sensor installed in the interior of the pneumatic shock absorber.

For solving said problem, the pneumatic shock absorber as defined by the invention is characterized according to the characterizing part of claim 1 in that an upper extension arm extends sideways from the upper support plate, and a lower extension arm extends sideways from the lower mounting plate, whereby the height sensor is positioned between the two extension arms.

Useful variations of the pneumatic shock absorber as defined by the invention are specified in claims 2 to 7.

Now, the invention is explained in the following with the help of an exemplified embodiment and by reference to schematic drawings, in which.

Figure 1:
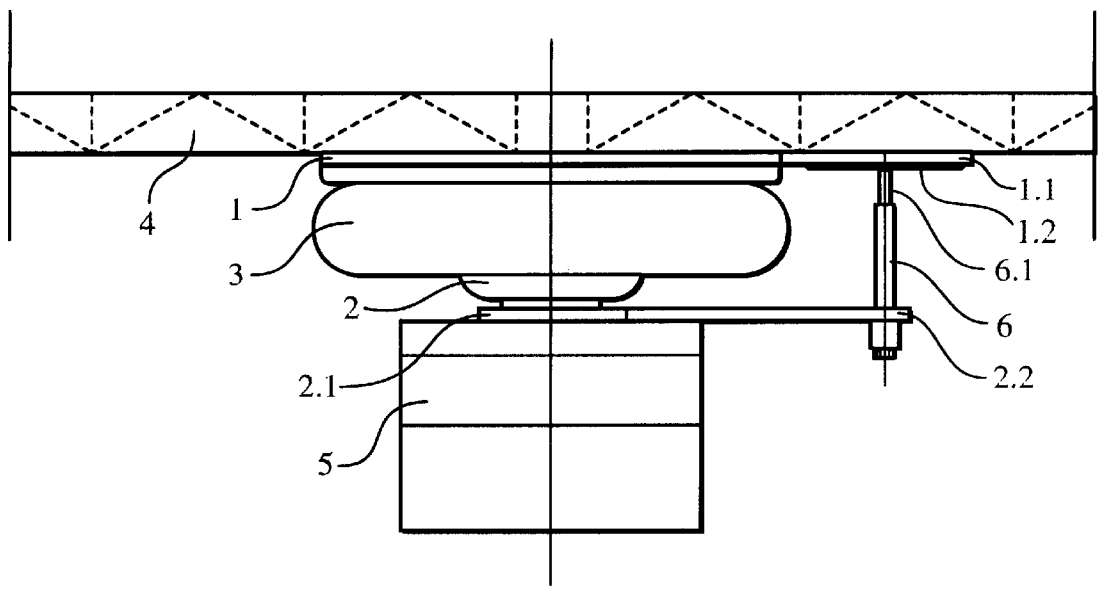
FIG. 1 shows a pneumatic shock absorber/height sensor system in the normal condition, i.e. the pneumatic shock absorber is deflected neither vertically nor horizontally.

A pneumatic shock absorber system is usually comprised of an upper support plate 1, a lower component 2, which may be designed in the form of a piston, a laminated spring or the like, and a bellows 3 consisting of an elastomeric material, which is acted upon by compressed air. The bellows 3 connects the upper support plate 1 and the lower component 2 with each other, using suitable fastening means. The upper support plate 1 is connected with the superstructure of the rail vehicle in a fixed manner, for example via through-extending support means 4. In the same way, the lower component 2 is connected in a fixed manner with a subassembly of the bogie, for example a cradle 5, via a lower mounting plate 2.1. Said cradle may serve as an additional pressure reservoir. In a possible exemplified embodiment of the type as shown in FIG. 1, the upper support plate 1 is designed in such a manner that an upper extension arm 1.1 is extended sideways. In the same way, a lower extension arm 2.2 is extended sideways from the lower mounting plate 2.1 as well. A height sensor 6 is positioned between the two extension arms with the help of suitable fastening means. The sensor tappet 6.1 is pressed by spring force against a sliding plate 1.2 mounted on the upper extension arm 1.1.

Figure 2:
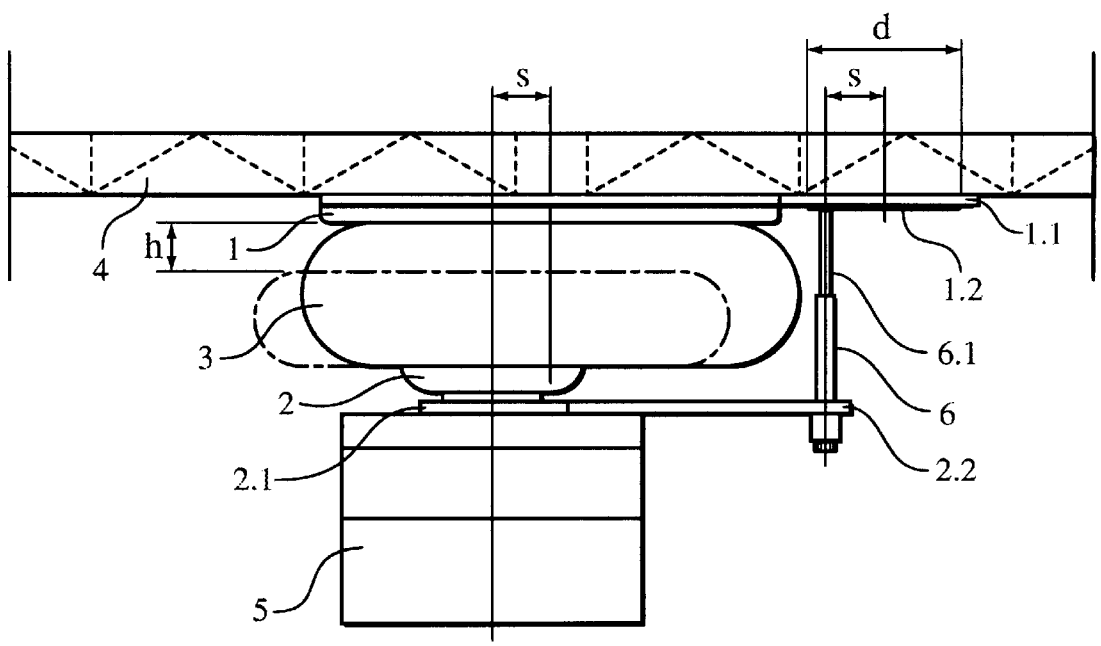
FIG. 2 shows the same pneumatic shock absorber/height sensor system in the condition in which the pneumatic shock absorber is deflected both vertically and horizontally.

Now, if, for example in the course of unloading of the railway car as shown in FIG. 2, the level of the pneumatic shock absorber changes by the amount of deflection "h", the change in the distance of the sensor tappet 6.1, which continues to be pressed by spring force against the sliding plate 1.2 mounted on the upper extension arm 1.1, is converted into an electrical signal in the height sensor 6. Said signal can be evaluated in a control unit, which in turn generates signals supplied to a control valve which, in the present case shown by way of example, would blow off compressed air.

If, as shown in FIG. 2, a horizontal deflection of the pneumatic shock absorber occurs as well, the sensor tappet 6.1 is capable of sliding off on the sliding plate 1.2 mounted on the upper extension arm 1.1 without falsifying thereby the measured result. In this connection, the diameter "d" of the sliding plate 1.2, of course, has to be greater than twice the amount of the deflection "s" maximally occurring on the vehicle.

The application of the solution as defined by the invention is not limited to the arrangement of a height sensor as shown by way of example in FIGS. 1 and 2 and operating based on a mechanical sensor principle. Other height sensors operating, for example based on the contactless sensor principle may be employed just as well.

In view of the aim to always maintain the level of the height of the superstructure of the vehicle within the limits of a preset tolerance irrespective of the load and/or driving conditions of the vehicle, or to adjust it to a preset value in the empty condition of the vehicle, it is basically unimportant whether or not the height sensor is mounted within or outside of the pneumatic shock absorber. Decisive is only that the virtual plane of the measurement, which is put up when a height sensor is used that operates based on a mechanical sensor principle, by the points of contact of the sensor tappet 6.1 of the height sensor 6 with the sliding plate 1.2, or put up by the points of reflection of the emitted measuring signal when a height sensor operating based on a contactless sensor principle is employed, conforms with its axes of symmetry in parallel and at a right angle in relation to the driving direction with the respective axes of symmetry of the vehicle.

Taking into account the above premise, it is therefore conceivable also as a further development of the solution as defined by the invention that for bypassing obstacles located within the proximity of the pneumatic shock absorber, for example obstacles such as other support elements of the superstructure of the vehicle, the upper extension arm 1.1 or the lower extension arm 2.2, or both extension arms are set at an angle. The precondition to be satisfied for a correct evaluation of the measured results is only that the conditions of symmetry specified above are maintained.

The height sensor 6 is usefully provided with a protective mechanical component, which may be a protective bellows (folding bellows). The protective component or protective bellows is a polymer material, preferably an elastomer, a thermoplastic elastomer (TPE), or a thermoplastic.

Figure 3:
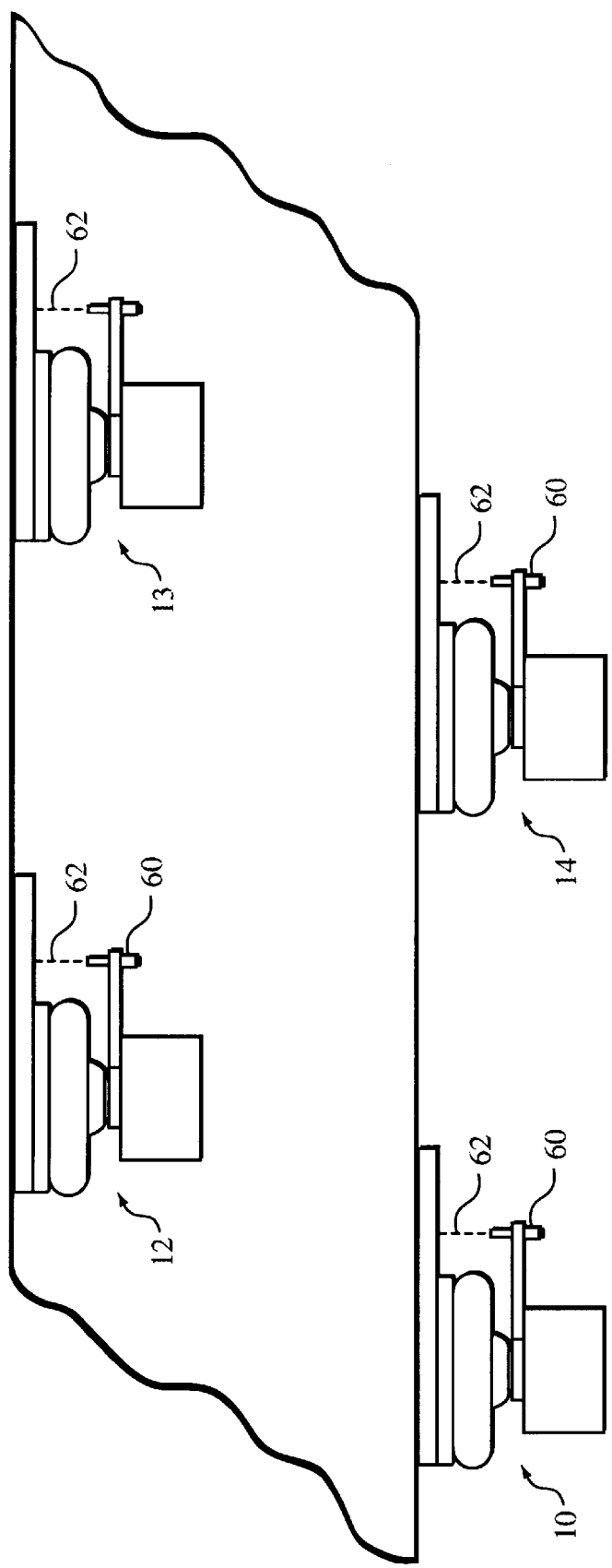
FIG. 3 shows a secondary damping system including four pneumatic shock absorbers/height sensor systems in which the height sensors operate based on a contactless sensor principle.

FIG. 3 shows a secondary damping system for a vehicle including four pneumatic shock absorbers 10, 12, 14, 16. Each shock absorber 10, 12, 14, 16 includes a height sensor 60 operating based on a contactless sensor principle by the points of reflection of the scanning signal 62 emitted by height sensor 60. Alternatively, a height sensor based on a mechanical sensor principle such as sensor 6 shown in FIGS. 1–2 may be used in place of height sensor 60.

In addition to the fact that the required components can be manufactured in a simple manner and at favorable costs, the advantages of the invention primarily lie in that changes on structural components/subassemblies of the vehicle such as, for example the drilling of holes for creating installation space, are avoided with said system solution. Even the drilling of holes in structural components/subassemblies of the vehicle so as to be able to screw on components of the sensor system (or even the welding-on of holding elements) can be entirely dispensed with.

A further advantage of the invention is that the pneumatic shock absorber/sensor system is already completely pre-assembled by the manufacturer, so that when the system is installed on the vehicle or the superstructure, no further work is required apart from setting the system up on the bogie and placing the superstructure on top.

Finally, the arrangement of all components as defined by the invention assures easy accessibility when the system is installed, dismantled and serviced.

LIST OF REFERENCE SYMBOLS

1 Upper support plate
1.1 Upper extension arm
1.2 Sliding plate
2 Lower component
2.1 Lower mounting plate
2.2 Lower extension arm
3 Bellows
4 Support
5 Cradle
6 Height sensor
6.1 Sensor tappet
h Vertical deflection of pneumatic shock absorber
s Horizontal deflection of pneumatic shock absorber
d Diameter of sliding plate

What is claimed is:

1. A pneumatic shock absorber for a vehicle moving in a driving direction comprising at least the following components:
    (a) an upper support plate;
    (b) a lower component comprising a lower mounting plate;
    (c) a bellows made of elastomeric material and acted upon by pressure and connecting the upper support plate and the lower component with each other, using fastening means; and
    (d) a height sensor;
        wherein an upper extension arm and a lower extension arm each are extended sideways from the upper support plate and from the lower mounting plate, respectively, whereby the height sensor is positioned between the two extension arms; and
        wherein said height sensor comprises a sensor tappet and operates based on a mechanical sensor principle by the points of contact of said sensor tappet with a sliding plate of the upper extension arm, said height sensor forming a virtual plane of measurement having axes of symmetry parallel to and at a right angle with, respectively, the driving direction of the vehicle and corresponding with the respective axes of symmetry of the vehicle.

2. The pneumatic shock absorber according to claim 1 wherein said lower component is designed in a form selected from the group consisting of a piston and a laminated spring.

3. The pneumatic shock absorber according to claim 1, wherein the upper extension arm and/or the lower extension arm are set at an angle.

4. The pneumatic shock absorber according to claim 1, wherein the height sensor is provided with a protective mechanical component.

5. The pneumatic shock absorber according to claim 4, wherein the protective component is a polymer material.

6. The pneumatic shock absorber according to claim 5 wherein the polymer material is selected from the group consisting of an elastomer, a thermoplastic elastomer and a thermoplastic.

7. The pneumatic shock absorber according to claim 4, wherein the protective component is a protective bellows.

8. The pneumatic shock absorber according to claim 7 wherein the protective bellows is a folding bellows.

9. A pneumatic shock absorber for a vehicle moving in a driving direction comprising at least the following components:
    (a) an upper support plate;
    (b) a lower component comprising a lower mounting plate;
    (c) a bellows made of elastomeric material and acted upon by pressure and connecting the upper support plate and the lower component with each other, using fastening means; and
    (d) a height sensor;
        wherein an upper extension arm and a lower extension arm each are extended sideways from the upper support plate and from the lower mounting plate, respectively, whereby the height sensor is positioned between the two extension arms; and
        wherein said height sensor emits a scanning signal and operates based on a contactless sensor principle by the points of reflection of said scanning signal, said height sensor forming a virtual plane of measurement on the upper extension arm having axes of symmetry parallel to and at a right angle with, respectively, the driving direction of the vehicle and corresponding with the respective axes of symmetry of the vehicle.

10. A secondary damping system for a vehicle moving in a driving direction, said system comprising four pneumatic shock absorbers, each pneumatic shock absorber comprising at least the following components:
    (a) an upper support plate;
    (b) a lower component comprising a mounting plate;
    (c) a bellows made of elastomeric material and acted upon by pressure and connecting the upper support plate and the lower component with each other, using fastening means; and
    (d) a height sensor;
        wherein an upper extension arm and a lower extension arm each are extended sideways from the upper support plate and from the lower mounting plate, respectively, whereby the height sensor is positioned between the two extension arms; and
        wherein said height sensor comprises a sensor tappet and operates based on a mechanical sensor principle by the points of contact of said sensor tappet with a sliding plate of the upper extension arm, said height sensor forming a virtual plane of measurement having axes of symmetry parallel to and at a right angle with, respectively, the driving direction of the vehicle, and corresponding with the respective axes of symmetry of the vehicle.

11. A secondary damping system for a vehicle moving in a driving direction, said system comprising four pneumatic shock absorbers, each pneumatic shock absorber comprising at least the following components:
    (a) an upper support plate;
    (b) a lower component comprising a mounting plate;

(c) a bellows made of elastomeric material and acted upon by pressure and connecting the upper support plate and the lower component with each other, using fastening means; and (d) a height sensor;

wherein an upper extension arm and a lower extension arm each are extended sideways from the upper support plate and from the lower mounting plate, respectively, whereby the height sensor is positioned between the two extension arms; and wherein said height sensor emits a scanning signal and operates based on a contactless sensor principle by the points of reflection of said scanning signal, said height sensor forming a virtual plane of measurement on the upper extension arm having axes of symmetry parallel to and at a right angle with, respectively, the driving direction of the vehicle, and corresponding with the respective axes of symmetry of the vehicle.

* * * * *

UNITED STATES PATENT AND TRADEMARK OFFICE
CERTIFICATE OF CORRECTION

PATENT NO. : 6,568,665 B2
DATED : May 27, 2003
INVENTOR(S) : G. Foerster et al.

It is certified that error appears in the above-identified patent and that said Letters Patent is hereby corrected as shown below:

<u>Title page,</u>
Item [22], the PCT filing date correctly should read:
-- March 7, 2001 --

Signed and Sealed this

Twenty-first Day of October, 2003

JAMES E. ROGAN
*Director of the United States Patent and Trademark Office*